Aug. 24, 1926.
C. C. PARDEE
1,597,105
VEHICLE END GATE
Filed Sept. 24, 1925
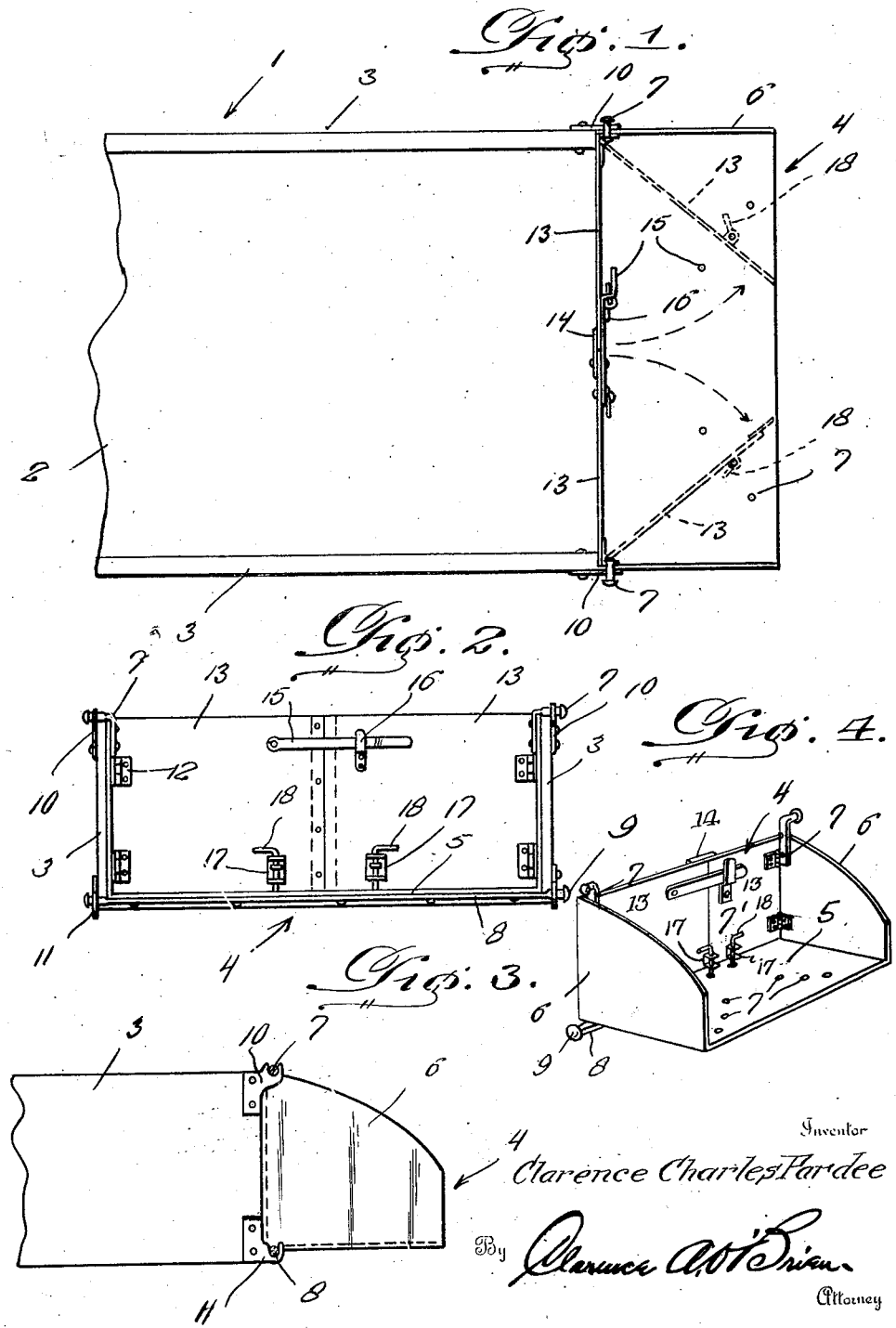
Inventor
Clarence Charles Pardee
By Clarence A. O'Brien
Attorney Patented Aug. 24, 1926.

1,597,105

UNITED STATES PATENT OFFICE.

CLARENCE CHARLES PARDEE, OF FULTON, ILLINOIS.

VEHICLE END GATE.

Application filed September 24, 1925. Serial No. 58,340.

This invention relates to an improved end-gate for vehicles, especially for wagon and truck bodies, and it has more particular reference to a structure of this kind which includes a shoveling device.

Briefly, the invention comprises a substantially U-shaped member forming a mounting for a pair of hingedly connected end-gates, the upstanding walls of said member being disposed in alignment with the side walls of the vehicle body, and there being means carried by said member to permit it to be detachably connected with special brackets on the vehicle body.

My principal aim is to generally improve upon structures of this class by providing one of comparative simplicity and durability which is such in construction as to render it practical and efficient in use and capable of being readily attached to wagon and vehicle bodies of conventional design.

The specific structural details and their advantages will become apparent from the following description and drawing.

In the accompanying drawing forming a part of this application and in which like numerals are employed to designate like parts throughout the same:

Figure 1 is a fragmentary top plan view of a wagon body or box equipped with an end gate structure constructed in accordance with the present invention.

Figure 2 is an end view looking towards the rear of the vehicle.

Figure 3 is a fragmentary side view.

Fig. 4 is a perspective view of the complete invention removed from the vehicle body.

Referring to the drawing in detail, the reference character 1 designates the body or box of an ordinary wagon and 2 designates the bottom thereof, and 3 the upstanding side walls.

The invention is in the form of an attachment for the rear end of the body. The attachment comprises, in the main, a substantially U-shaped member designated generally by the reference character 4. This is of the construction shown more plainly in Figure 4. By reference to this figure it will be seen that the same comprises a bottom 5 and upstanding end walls 6, these walls being adapted for disposition in longitudinal alignment with the aforesaid walls 3 of the wagon body. The bottom 5 is formed with two rows of holes 7 disposed on the approximate arcs indicated. The purpose of these will appear later. Mounted upon the upper portion of the end walls 6 are duplicate attaching hangers 7 having right angularly disposed and outwardly directed upper end portions formed with heads on their extremities. The construction of these hangers is very plain from Figure 2. Extending across the inner longitudinal edge of the under side of the bottom 5 is a bar 8. This bar is formed on its extended end portion with heads 9. The construction so far described provides a novel shoveling device for attachment to the rear end of the body of a vehcile, the same being especially usful in handling coal, sand and the like.

Mountd upon the rear ends of the side walls 3 at the top are brackets 10, and at the bottom are somewhat similar brackets 11. These brackets are formed with outstanding potions notched to form hook-shaped seats for the headed ends 9 of the bar 8 and the similarly constructed ends of the hangers 7. The U-shaped member 4 is thus detachedly suspended from the brackets 10 and 11 and the proportions are such as to dispose the top of the bottom plate 11 substantially flush with the bottom 2 of the wagon body.

Attached to the end walls of the member 4 by suitable hinges 12 are the swinging gates 13. These gates, the same being of substantially duplicate construction with one gate carrying a cover strip 14 on its inner side to overlap the joint formed between the abutting ends of the gates. Mounted on the outer side of one gate is a pivoted latch 15 cooperating with a keeper 16 on the other gate. On the bottom portions of the gates are small U-shaped brackets 17 carrying slidably mounted L-shaped retainers 18. These retainers are adapted to engage in the aforesaid holes 7'. The gates are adapted to swing out to the dotted line positions as indicated in Figure 1, at which time the retainers 18 are engaged with the holes 7 to hold the gates in different angular positions.

From the foregoing description it is obvious that I have evolved and produced a novel and inexpensive device forming a combined end-gate structure and shoveling board, the same being such that it can be hung from the special brackets attached to the side walls of the wagon body as shown.

By considering the description in connection with the drawing, persons skilled with inventions of this class will doubtless be able to attain a clear understanding of the invention. Therefore a more lengthy description is thought unnecessary.

Minor changes coming within the field of invention claimed may be resorted to if desired.

I claim:—

In a structure of the class described, a substantially U-shaped member provided with headed attaching means, brackets adapted to be mounted upon a wagon body for cooperation with said headed attaching means, a pair of end-gates hingedly mounted on the vertical walls of said U-shaped member, and retaining means for said gates.

In testimony whereof I affix my signature.

CLARENCE CHARLES PARDEE.